(12) United States Patent
Satake

(10) Patent No.: US 10,088,640 B2
(45) Date of Patent: Oct. 2, 2018

(54) OPTICAL FIBER HOLDING STRUCTURE, OPTICAL TRANSMISSION MODULE, AND METHOD OF MANUFACTURING OPTICAL FIBER HOLDING STRUCTURE

(71) Applicant: OLYMPUS CORPORATION, Tokyo (JP)

(72) Inventor: Nau Satake, Yokohama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/690,480

(22) Filed: Aug. 30, 2017

(65) Prior Publication Data

US 2017/0363825 A1 Dec. 21, 2017

Related U.S. Application Data

(63) Continuation of application No. PCT/JP2015/056863, filed on Mar. 9, 2015.

(51) Int. Cl.
G02B 6/42 (2006.01)

(52) U.S. Cl.
CPC ......... *G02B 6/4246* (2013.01); *G02B 6/4257* (2013.01); *G02B 6/4281* (2013.01)

(58) Field of Classification Search
CPC ... G02B 6/4246; G02B 6/4257; G02B 6/4281
See application file for complete search history.

(56) References Cited

U.S. PATENT DOCUMENTS

| 6,080,936 A * | 6/2000 | Yamasaki ......... H01R 43/0235 |
| | | 174/260 |
| 6,975,663 B2 | 12/2005 | Sekiya et al. |
| 9,435,925 B2 | 9/2016 | Motohara |
| 2002/0085826 A1* | 7/2002 | Matsumoto .............. G02B 6/30 |
| | | 385/137 |

(Continued)

FOREIGN PATENT DOCUMENTS

| JP | H04-330788 A | 11/1992 |
| JP | H07-336013 A | 12/1995 |

(Continued)

OTHER PUBLICATIONS

International Search Report dated Apr. 7, 2015 issued in PCT/JP2015/056863.

*Primary Examiner* — Akm Enayet Ullah
(74) *Attorney, Agent, or Firm* — Scully, Scott, Murphy & Presser, P.C.

(57) ABSTRACT

An optical fiber holding structure includes: a structure main body having a prismatic shape; a through hole into which an optical fiber is inserted; a protruding portion having a columnar shape projecting from the structure main body and configured to be inserted into an opening portion of a substrate; and a contact portion configured to abut on a surface of the substrate to position an optical element and the optical fiber at a predetermined distance. The through hole is formed so as to penetrate from a surface of the structure main body through which the optical fiber is inserted to an end surface of the protruding portion, and at least one side surface of the structure main body is flush with at least one side surface of the protruding portion.

8 Claims, 13 Drawing Sheets

(56) References Cited

U.S. PATENT DOCUMENTS

| | | | | |
|---|---|---|---|---|
| 2002/0180041 A1* | 12/2002 | Sahara | ............... | H01L 23/3114 257/738 |
| 2007/0195220 A1* | 8/2007 | Ono | ................. | G02F 1/133308 349/58 |
| 2008/0318497 A1* | 12/2008 | Kimura | ................... | B24B 37/04 451/54 |
| 2012/0132971 A1* | 5/2012 | Mikasa | ............ | H01L 27/10814 257/296 |
| 2012/0273859 A1* | 11/2012 | Oyu | ................... | H01L 27/0207 257/296 |

FOREIGN PATENT DOCUMENTS

| | | |
|---|---|---|
| JP | 2000-121885 A | 4/2000 |
| JP | 2002-324941 A | 11/2002 |
| JP | 2003-248132 A | 9/2003 |
| JP | 2010-164708 A | 7/2010 |
| JP | 2014-010329 A | 1/2014 |

* cited by examiner

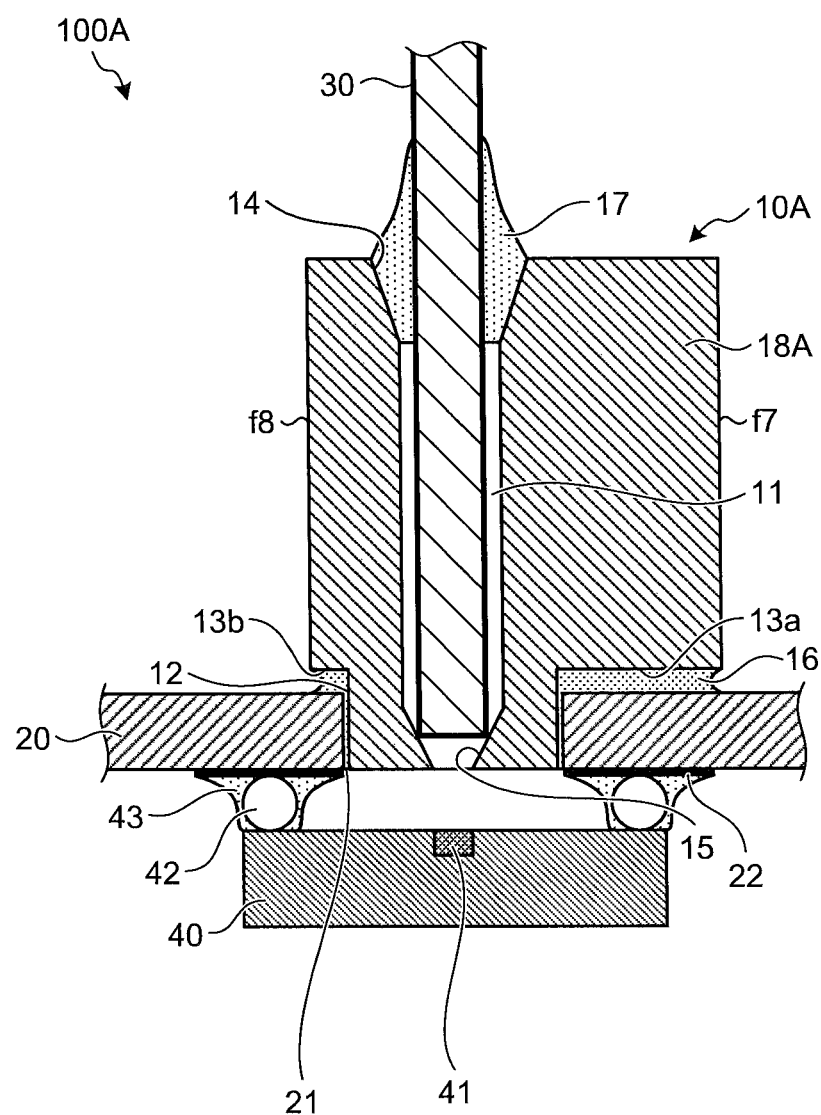

US 10,088,640 B2

OPTICAL FIBER HOLDING STRUCTURE, OPTICAL TRANSMISSION MODULE, AND METHOD OF MANUFACTURING OPTICAL FIBER HOLDING STRUCTURE

CROSS REFERENCES TO RELATED APPLICATIONS

This application is a continuation of International Application No. PCT/JP2015/056863, filed on Mar. 9, 2015, the entire contents of which are incorporated herein by reference.

BACKGROUND

The present disclosure relates to an optical fiber holding structure, an optical transmission module, and a method of manufacturing an optical fiber holding structure.

In the related art, a ferrule (optical fiber holding structure) including a through hole and a collar-shaped flange portion is used for an optical transmission module that performs optical transmission using an optical element such as a light emitting element and a light receiving element and an optical fiber. Specifically, the optical fiber is inserted into the through hole, and the flange portion provided on a proximal end side of a main body is brought into contact with a substrate (for example, refer to JP H07-336013 A, JP 2000-121885 A, JP 2003-248132 A, and JP 2010-164708 A).

However, in the ferrule described in each of JP H07-336013 A, JP 2000-121885 A, JP 2003-248132 A, and JP 2010-164708 A, the flange is provided on the entire circumference of an outer peripheral portion of the main body of the ferrule. Therefore, it is difficult to increase the mounting density in a case where a wiring layer is formed or an electronic component is mounted on the substrate in addition to the optical element and the ferrule.

SUMMARY

According to one aspect of the present disclosure, there is provided an optical fiber holding structure for being mounted on a substrate equipped with an optical element that includes a light receiving unit inputting an optical signal or a light emitting unit outputting an optical signal such that the optical fiber holding structure faces the optical element via the substrate, the optical fiber holding structure being configured to hold an optical fiber that transmits the optical signal to or from the optical element, the optical fiber holding structure including: a structure main body having a prismatic shape; a through hole into which the optical fiber is inserted; a protruding portion having a columnar shape projecting from the structure main body and configured to be inserted into an opening portion of the substrate; and a contact portion configured to abut on a surface of the substrate to position the optical element and the optical fiber at a predetermined distance, wherein the through hole is formed so as to penetrate from a surface of the structure main body through which the optical fiber is inserted to an end surface of the protruding portion, and at least one side surface of the structure main body is flush with at least one side surface of the protruding portion.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 6 is a cross-sectional view of an optical transmission module with the optical fiber holding structure of FIGS. 5A and 5B;

DETAILED DESCRIPTION

Figure 1A:
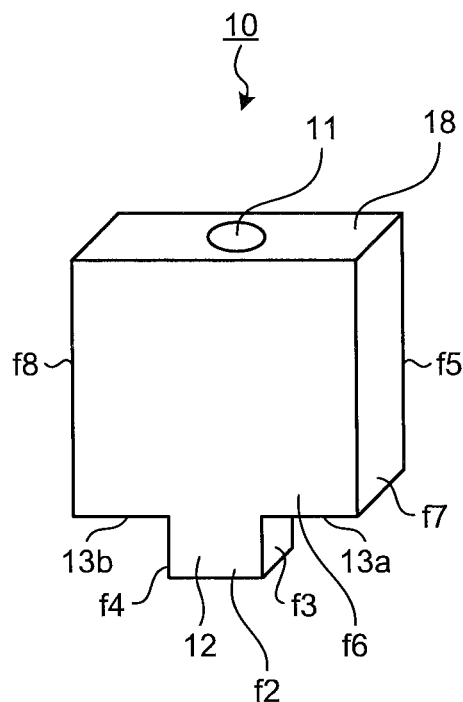
FIG. 1A is a perspective view of an optical fiber holding structure according to a first embodiment of the present disclosure.

Hereinafter, modes for practicing the present disclosure (hereinafter referred to as "embodiments") will be described with reference to the accompanying drawings. The present disclosure is not limited by the embodiments. In the drawings, identical elements are provided with the same reference signs. It should be noted that the drawings are only schematic, and a relation between thickness and width of each member and a ratio of each member or the like are different from actual ones. Dimensional relations and ratios between the elements in the different drawings may also be different from one another.

First Embodiment

Figure 1B:
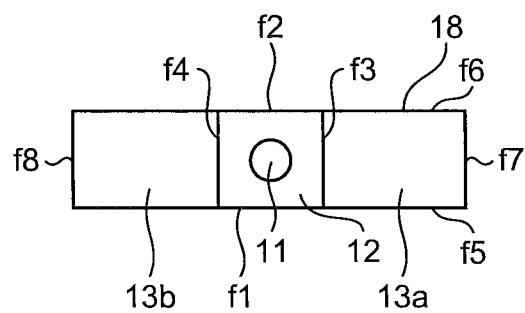
FIG. 1B is a plan view of the optical fiber holding structure of FIG. 1A seen from a bottom side where a protruding portion is formed.

FIG. 1A is a perspective view of an optical fiber holding structure according to a first embodiment of the present disclosure. FIG. 1B is a plan view of the optical fiber holding structure of FIG. 1A seen from a bottom side where a protruding portion is formed. The optical fiber holding structure 10 according to the first embodiment of the present disclosure includes a structure main body 18, a through hole 11, a protruding portion 12, and contact portions 13a and 13b. The structure main body 18 has a prismatic shape. An optical fiber is inserted into the through hole 11. The protruding portion 12 has a prismatic shape projecting from the structure main body 18, and is inserted into an opening portion of a substrate to be described later. The contact portions 13a and 13b abut on a surface of the substrate.

Two opposite side surfaces f5 and f6 of the structure main body 18 of the optical fiber holding structure 10 are flush with two opposite side surfaces f1 and f2 of the protruding portion 12, respectively. Other side surfaces f7 and f8 of the structure main body 18 are not flush with other side surfaces f3 and f4 of the protruding portion 12, and the contact portions 13a and 13b are present between the side surfaces f7 and f8 of the structure main body 18 and the side surfaces f3 and f4 of the protruding portion 12.

Figure 2:
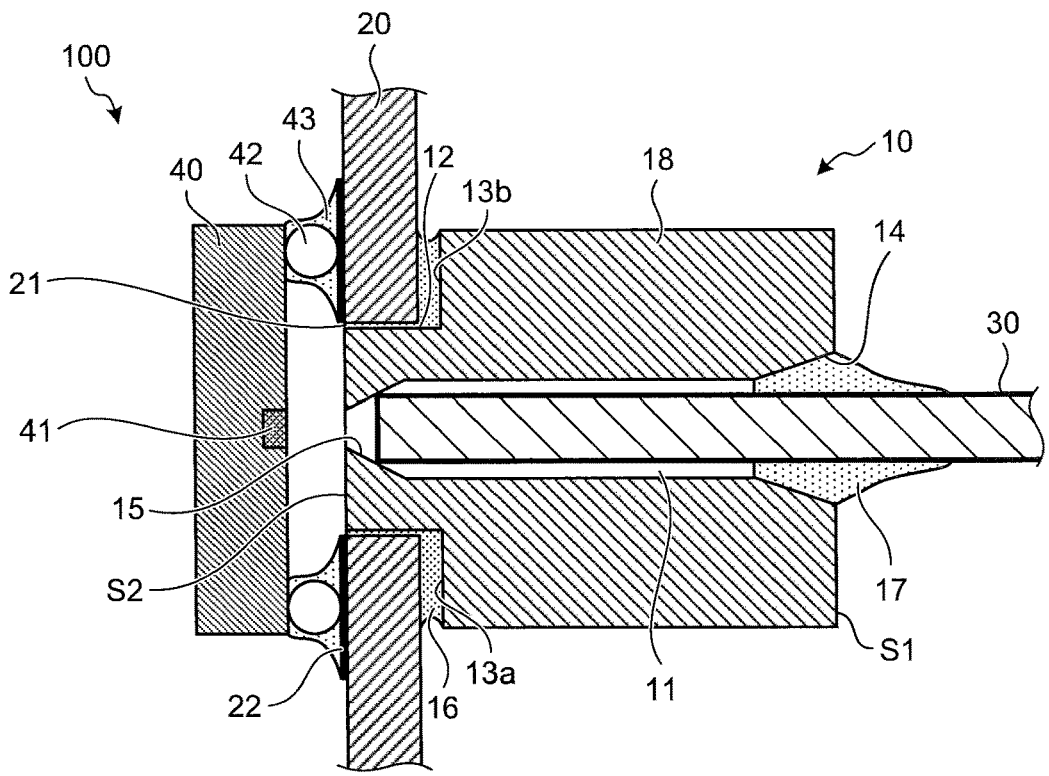
FIG. 2 is a cross-sectional view of an optical transmission module with the optical fiber holding structure of FIGS. 1A and 1B.

FIG. 2 is a cross-sectional view of an optical transmission module with the optical fiber holding structure 10 of FIGS. 1A and 1B. As illustrated in FIG. 2, the optical transmission module 100 includes an optical fiber 30, the optical fiber holding structure 10, a substrate 20, and a light emitting element 40. The optical fiber 30 transmits an optical signal. The optical fiber holding structure 10 holds the optical fiber 30. The substrate 20 has an opening portion 21 into which the protruding portion 12 of the optical fiber holding structure 10 is inserted. In the optical transmission module 100 according to the first embodiment, either a light receiving element such as a photodiode or the light emitting element 40 such as a surface-emitting laser can be adopted as an optical element. The following description is based on the premise that the optical element is the light emitting element 40.

The substrate 20 has a planar shape. A flexible printed wiring (FPC) substrate, a ceramic substrate, a glass epoxy substrate, a glass substrate, a silicon substrate or the like is used as the substrate 20. The opening portion 21 is formed in the substrate 20, and an optical signal emitted from a light emitting unit 41 of the light emitting element 40 to be described later is transmitted to the optical fiber 30 via the opening portion 21. The inner diameter of the opening portion 21 is formed to have the same shape as or to be slightly larger than the outer shape of the protruding portion 12.

A connection electrode 22 is formed on the substrate 20, and an electric signal is sent to the light emitting element 40 via the connection electrode 22. The light emitting element 40 is a flip-chip element which is mounted on the substrate 20 so that the light emitting unit 41 faces the substrate 20. The light emitting element 40 is mounted on the substrate 20 in such a manner, for example, that an Au bump 42 is formed on the light emitting element 40, and the Au bump 42 is joined onto the connection electrode 22 of the substrate 20 using ultrasound, or an adhesive 43 such as an underfill material and a sidefill material is injected to a joint portion and cured. Alternatively, the light emitting element 40 may be mounted on the substrate 20 without the use of the Au bump 42 in such a manner that a solder paste or the like is printed on the substrate 20, the light emitting element 40 is arranged, and then the solder is melted through reflow soldering or the like. Alternatively, the light emitting element 40 may be mounted on the substrate 20 in such a manner that a solder bump is formed on the light emitting element 40, arranged on the connection electrode 22 of the substrate 20 using a mounting device, and melted through soldering.

The light emitting element 40 is mounted on the substrate 20 so that the center of the light emitting unit 41 of the light emitting element 40 is aligned with the center of the opening portion 21 using a two-view optical system, and the opening portion 21 is located right under the light emitting unit 41.

The optical fiber 30 includes a core that transmits light and a cladding provided on an outer periphery of the core, with the core and the cladding covered with a jacket such as resin. In terms of protection of the optical fiber 30, the optical fiber 30 is preferably inserted into the through hole 11 of the optical fiber holding structure 10 with the jacket on. Alternatively, the optical fiber 30 may be inserted into the through hole 11 with the jacket removed.

The through hole 11 of the optical fiber holding structure 10 is formed so as to penetrate from an upper surface S1 of the structure main body 18 through which the optical fiber 30 is inserted to an end surface S2 of the protruding portion 12. The through hole 11 is formed perpendicular to the upper surface S1 of the structure main body 18 and the end surface S2 of the protruding portion 12 in the center of the structure main body 18 and the protruding portion 12. A taper 14 and a taper 15 are formed at the respective ends of the through hole 11.

Since the taper 15 having a predetermined shape is formed adjacent to the end surface S2 in the through hole 11, the optical fiber 30 can be positioned on an inner surface of the taper 15, and thus accurately aligned with the light emitting unit 41. Since the taper 14 is formed adjacent to the upper surface S1 in the through hole 11, the optical fiber 30 is easily inserted into the through hole 11. In addition, since an adhesive 17 is supplied into the taper 14 so that the optical fiber 30 and the optical fiber holding structure 10 are joined together, the joint area between the optical fiber holding structure 10 and the optical fiber 30 can be enlarged, and the joint strength can be increased.

The optical fiber holding structure 10 only needs to be mounted in such a manner, for example, that an adhesive 16 is applied to a mounting surface of the substrate 20, the protruding portion 12 of the optical fiber holding structure 10 is inserted into the opening portion 21 of the substrate 20, and the adhesive 16 is cured. The optical fiber holding structure 10 is mounted so as to face the light emitting element 40 via the substrate 20.

Figure 3:
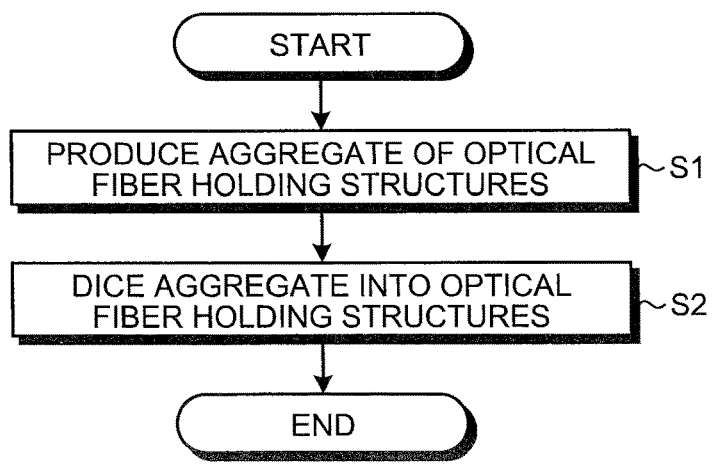
FIG. 3 is a flowchart for explaining a procedure for manufacturing the optical fiber holding structure according to the first embodiment of the present disclosure.
Figure 4A:
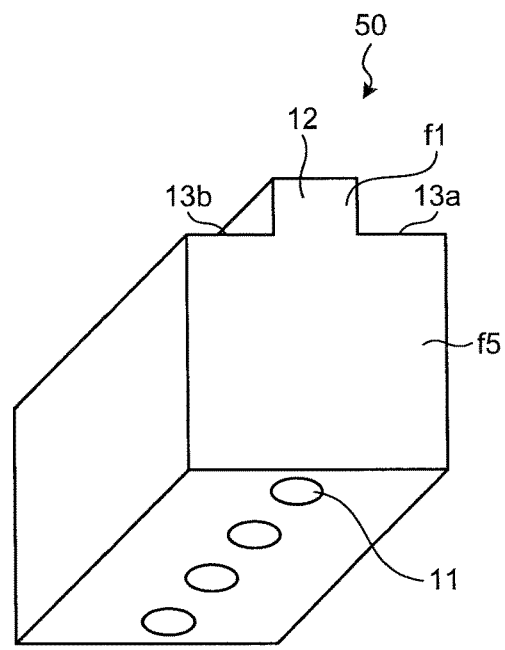
FIG. 4A is a view for explaining the procedure for manufacturing the optical fiber holding structure according to the first embodiment of the present disclosure.
Figure 4B:
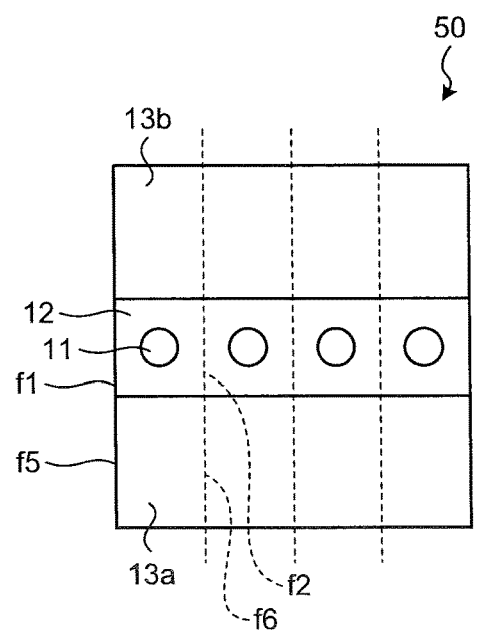
FIG. 4B is a view for explaining the procedure for manufacturing the optical fiber holding structure according to the first embodiment of the present disclosure.

Next, a method of manufacturing the optical fiber holding structure 10 of the first embodiment will be described. FIG. 3 is a flowchart for explaining a procedure for manufacturing the optical fiber holding structure 10 according to the first embodiment of the present disclosure. FIGS. 4A and 4B are views for explaining the procedure for manufacturing the optical fiber holding structure 10 according to the first embodiment of the present disclosure.

The optical fiber holding structure 10 is formed so that the structure main body 18 and the protruding portion 12 have the prismatic shapes, and the two opposite side surfaces f5 and f6 of the structure main body 18 are flush with the two opposite side surfaces f1 and f2 of the protruding portion 12, respectively. Therefore, the optical fiber holding structure 10 can be manufactured by forming an aggregate of two or more optical fiber holding structures 10 that are in contact with each other at the side surfaces f5 and f6 of the structure main bodies 18 flush with the side surfaces f1 and f2 of the protruding portions 12, and dicing, into the optical fiber holding structures 10, the aggregate along the side surfaces f5 and f6 of the structure main bodies 18 of the adjacent optical fiber holding structures 10.

First, an aggregate 50 of optical fiber holding structures 10 is produced (Step S1). Although the aggregate 50 illustrated in FIGS. 4A and 4B is diced into four optical fiber holding structures 10, the number of optical fiber holding structures 10 that constitute the aggregate 50 is not limited to four. The aggregate 50 may be produced from a material for the aggregate 50, e.g., ceramics such as zirconia or resin, through injection molding. Alternatively, the aggregate 50 may be produced by temporarily forming a prismatic body, and then cutting the prismatic body to produce the protruding portions 12 and the contact portions 13 (13a and 13b) and form the through holes 11. Alternatively, the aggregate 50 may be produced by forming a prismatic body, forming the through holes 11 in the prismatic body, and finally cutting the prismatic body to produce the protruding portions 12 and the contact portions 13 (13a and 13b).

After the aggregate 50 is produced (Step S1), the aggregate 50 is diced into the optical fiber holding structures 10 along the side surfaces f5 and f6 of the structure main bodies 18 flush with the side surfaces f1 and f2 of the protruding portions 12 as indicated by dotted lines in FIG. 4B, whereby the optical fiber holding structures 10 can be manufactured (Step S2).

The optical fiber holding structure 10 of the first embodiment is configured so that the protruding portion 12 and the structure main body 18 have the prismatic shapes, and the two opposite side surfaces f5 and f6 of the structure main body 18 are flush with the two opposite side surfaces f1 and f2 of the protruding portion 12, respectively. Therefore, the area mounted on the substrate 20 can be reduced, and the mounting density of the substrate 20 can be increased. In addition, the optical fiber holding structures 10 can be manufactured simply by producing the aggregate 50 and dicing the aggregate 50 along the side surfaces f5 and f6 of the structure main bodies 18 flush with the side surfaces f1 and f2 of the protruding portions 12. Furthermore, the optical fiber holding structure 10 is mounted so that the contact portions 13a and 13b abut on the substrate 20, whereby the optical fiber 30 held by the optical fiber holding structure 10 and the light emitting element 40 can be accurately positioned.

Although the optical fiber holding structure 10 according to the first embodiment includes the taper 15 adjacent to the end surface S2 in the through hole 11, the optical fiber holding structure 10 may be configured not to be provided with the taper 15. In a case where the taper 15 is not formed, the optical fiber 30 is inserted so as to reach the end surface S2 of the protruding portion 12. The height of the protruding portion 12 is changed to a predetermined height, whereby the optical fiber 30 can be aligned with the light emitting element 40.

Figure 5A:
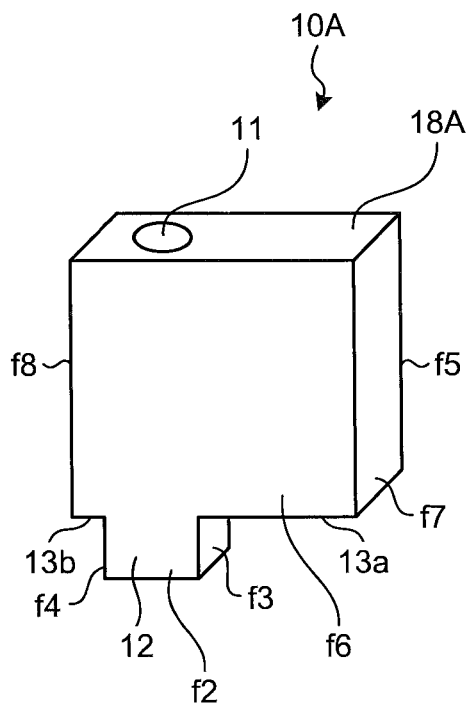
FIG. 5A is a perspective view of an optical fiber holding structure according to a first variation of the first embodiment of the present disclosure.
Figure 5B:
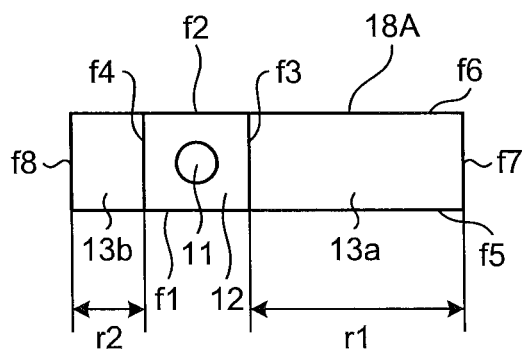
FIG. 5B is a plan view of the optical fiber holding structure of FIG. 5A seen from a bottom side where a protruding portion is formed.

Although the through hole 11 and the protruding portion 12 are formed in the center of the structure main body 18 of the optical fiber holding structure 10 according to the first embodiment, the through hole 11 and the protruding portion 12 may be displaced from the center axis of the prism of the structure main body 18. FIG. 5A is a perspective view of an optical fiber holding structure according to a first variation of the first embodiment of the present disclosure. FIG. 5B is a plan view of the optical fiber holding structure of FIG. 5A seen from a bottom side where the protruding portion is formed. FIG. 6 is a cross-sectional view of an optical transmission module with the optical fiber holding structure of FIGS. 5A and 5B. As illustrated in FIG. 6, the optical transmission module 100A includes the optical fiber 30, the optical fiber holding structure 10A, the substrate 20, and the light emitting element 40. The optical fiber 30 transmits an optical signal. The optical fiber holding structure 10A holds the optical fiber 30. The substrate 20 has the opening portion 21 into which the protruding portion 12 of the optical fiber holding structure 10A is inserted. The optical transmission module 100A may include a light receiving element as an optical element.

In the optical fiber holding structure 10A according to the first variation of the first embodiment, the through hole 11 and the protruding portion 12 are displaced from the center of a structure main body 18A. Consequently, the length r1 from an end surface of the contact portion 13a to an end surface of the protruding portion 12 is longer than the length r2 from an end surface of the contact portion 13b to an end surface of the protruding portion 12. Since the optical fiber holding structure 10A is configured so that the through hole 11 and the protruding portion 12 are displaced from the center of the structure main body 18A, the degree of freedom of the design of the substrate 20 can be increased in relation to the mounting of the optical fiber holding structure 10A on the substrate 20.

For example, in FIG. 6, an electronic component can be mounted or wiring can be formed adjacent to the contact portion 13b on the surface of the substrate 20. In addition, in a manner similar to the optical fiber holding structure 10 of the first embodiment, the optical fiber holding structure 10A is mounted so that the contact portions 13a and 13b abut on the substrate 20, whereby the optical fiber 30 and the light emitting element 40 can be accurately positioned.

The optical fiber holding structure 10A of the first variation is configured by displacing, in the optical fiber holding structure 10 of the first embodiment, the through hole 11 and the protruding portion 12 from the center of the structure main body 18. Alternatively, the through hole 11 and the protruding portion 12 may be displaced from the center of the structure main body 18A by cutting off, in the optical fiber holding structure 10 according to the first embodiment, a part of the structure main body 18 including the side surface f8.

Figure 7A:
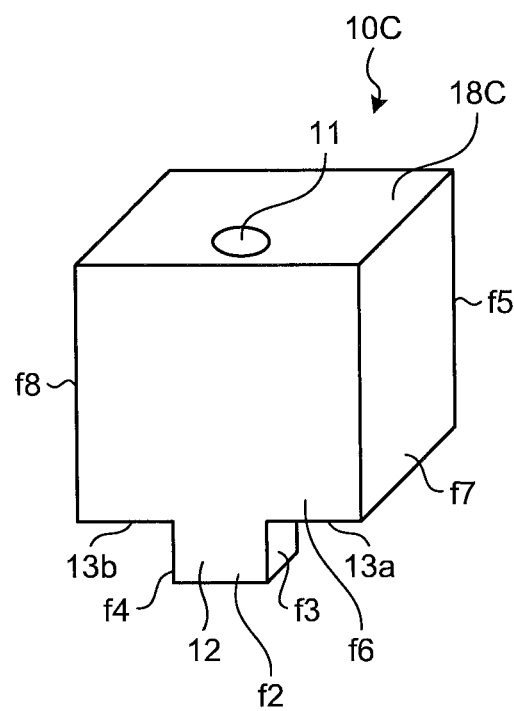
FIG. 7A is a perspective view of an optical fiber holding structure according to a second variation of the first embodiment of the present disclosure.
Figure 7B:
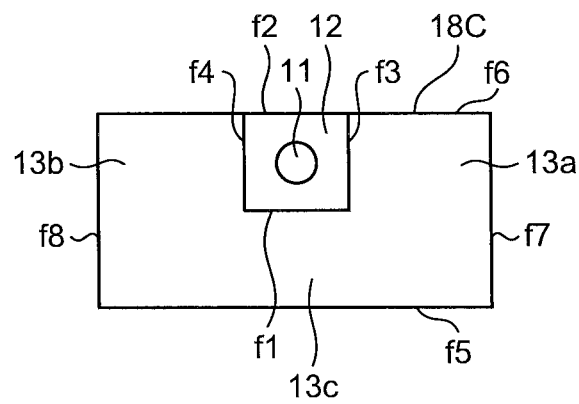
FIG. 7B is a plan view of the optical fiber holding structure of FIG. 7A seen from a bottom side where a protruding portion is formed.

The optical fiber holding structure 10 only needs to be configured so that at least one side surface of the structure main body 18 is flush with at least one side surface of the protruding portion 12. FIG. 7A is a perspective view of an optical fiber holding structure according to a second variation of the first embodiment of the present disclosure. FIG. 7B is a plan view of the optical fiber holding structure of FIG. 7A seen from a bottom side where the protruding portion is formed.

The optical fiber holding structure 100 according to the second variation of the first embodiment is configured so that the side surface f6 of a structure main body 18C is flush with the side surface f2 of the protruding portion 12, and contact portions 13a, 13b, and 13c are formed around the protruding portion 12.

In the optical fiber holding structure 100 according to the second variation of the first embodiment, the side surface f6 of the structure main body 18C is formed so as to be flush with the side surface f2 of the protruding portion 12, and a contact portion does not exist adjacent to the side surface f6. Therefore, the area in which the optical fiber holding structure 10C is mounted on the substrate 20 can be reduced, and the mounting density of the substrate 20 can be increased. In addition, the optical fiber holding structure 10C is mounted so that the contact portions 13a, 13b, and 13c abut on the substrate 20, whereby the optical fiber 30 and the light emitting element 40 can be accurately positioned.

Figure 8A:
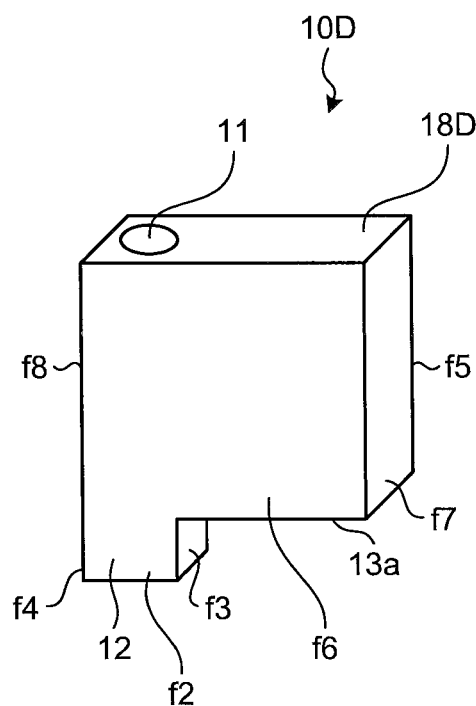
FIG. 8A is a perspective view of an optical fiber holding structure according to a third variation of the first embodiment of the present disclosure.
Figure 8B:
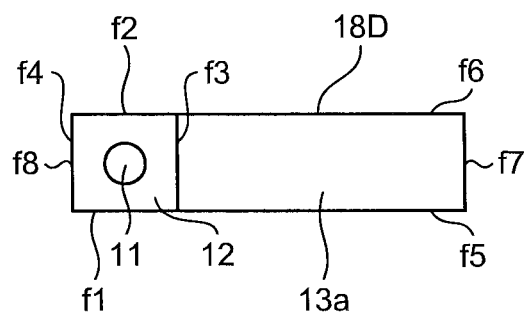
FIG. 8B is a plan view of the optical fiber holding structure of FIG. 8A seen from a bottom side where a protruding portion is formed.
Figure 9:
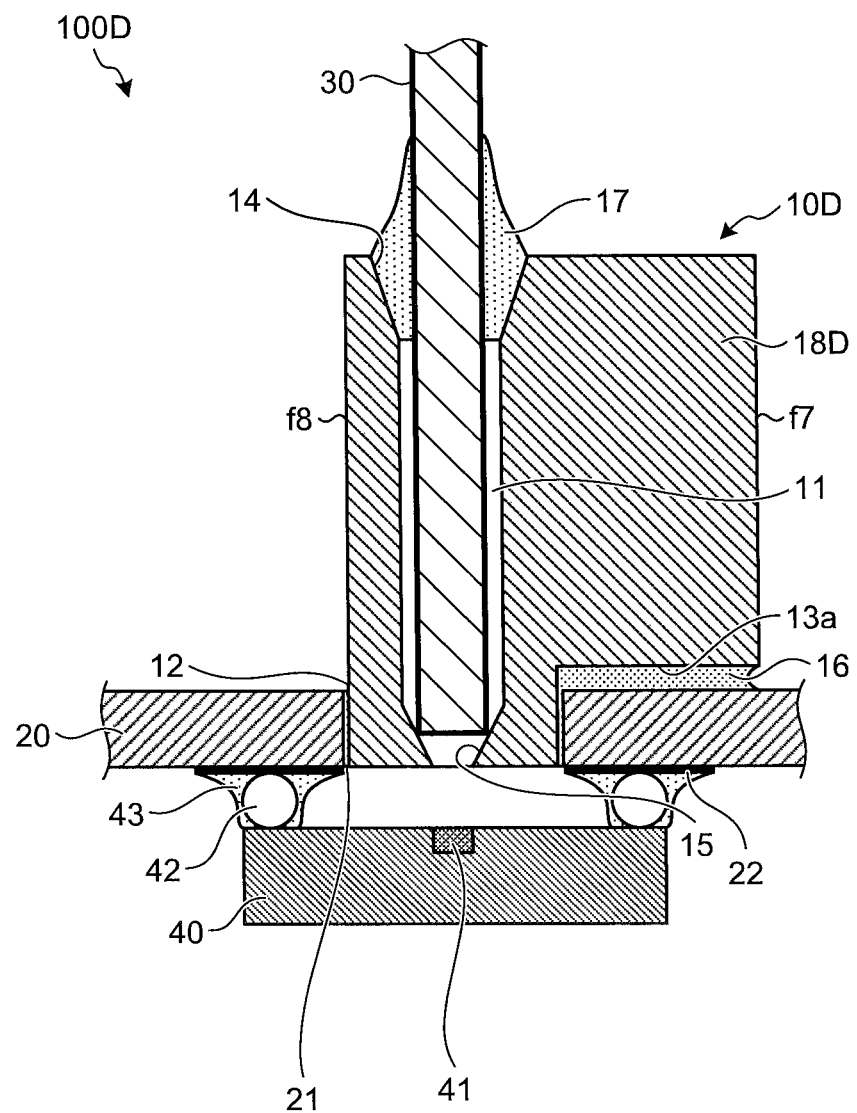
FIG. 9 is a cross-sectional view of an optical transmission module with the optical fiber holding structure of FIGS. 8A and 8B.

Furthermore, the optical fiber holding structure 10 may be configured so that three side surfaces of the structure main body 18 are flush with respective three side surfaces of the protruding portion 12. FIG. 8A is a perspective view of an optical fiber holding structure according to a third variation of the first embodiment of the present disclosure. FIG. 8B is a plan view of the optical fiber holding structure of FIG. 8A seen from a bottom side where a protruding portion is formed. FIG. 9 is a cross-sectional view of an optical transmission module with the optical fiber holding structure of FIGS. 8A and 8B. As illustrated in FIG. 9, the optical transmission module 100D includes the optical fiber 30, the optical fiber holding structure 10D, the substrate 20, and the light emitting element 40. The optical fiber 30 transmits an optical signal. The optical fiber holding structure 10D holds the optical fiber 30. The substrate 20 has the opening portion 21 into which the protruding portion 12 of the optical fiber holding structure 10D is inserted. The optical transmission module 100D may include a light receiving element as an optical element.

The optical fiber holding structure 10D according to the third variation of the first embodiment is configured so that the three side surfaces f5, f6, and f8 of a structure main body 18D are flush with the three side surfaces f1, f2, and f4 of the protruding portion 12, respectively. Therefore, since contact portions do not exist adjacent to the side surfaces f5, f6, and f8 of the optical fiber holding structure 10D, the area in which the optical fiber holding structure 10D is mounted on the substrate 20 can be reduced, and the mounting density of the substrate 20 can be increased. In addition, the optical fiber holding structure 10D is mounted so that the contact portion 13a abuts on the substrate 20, whereby the optical fiber 30 and the light emitting element 40 can be accurately positioned.

The optical fiber holding structure 10D of the third variation is configured by displacing, in the optical fiber holding structure 10 of the first embodiment, the through hole 11 and the protruding portion 12 from the center axis of the prism of the structure main body 18 to the vicinity of the side surface f8 of the structure main body 18 so that the side surface f8 is flush with the side surface f4 of the protruding portion 12. Alternatively, the side surface f8 may be flush with the side surface f4 of the protruding portion 12 by cutting off, in the optical fiber holding structure 10 according to the first embodiment, a part of the structure main body 18 including the side surface f8.

In the first embodiment and the respective variations described above, the protruding portion 12 has the prismatic shape. However, a side surface that is not in contact with a side surface of the structure main body may have an arc shape or the like as long as a side surface that is in contact with a side surface of the structure main body is a flat surface.

Second Embodiment

Figure 10:
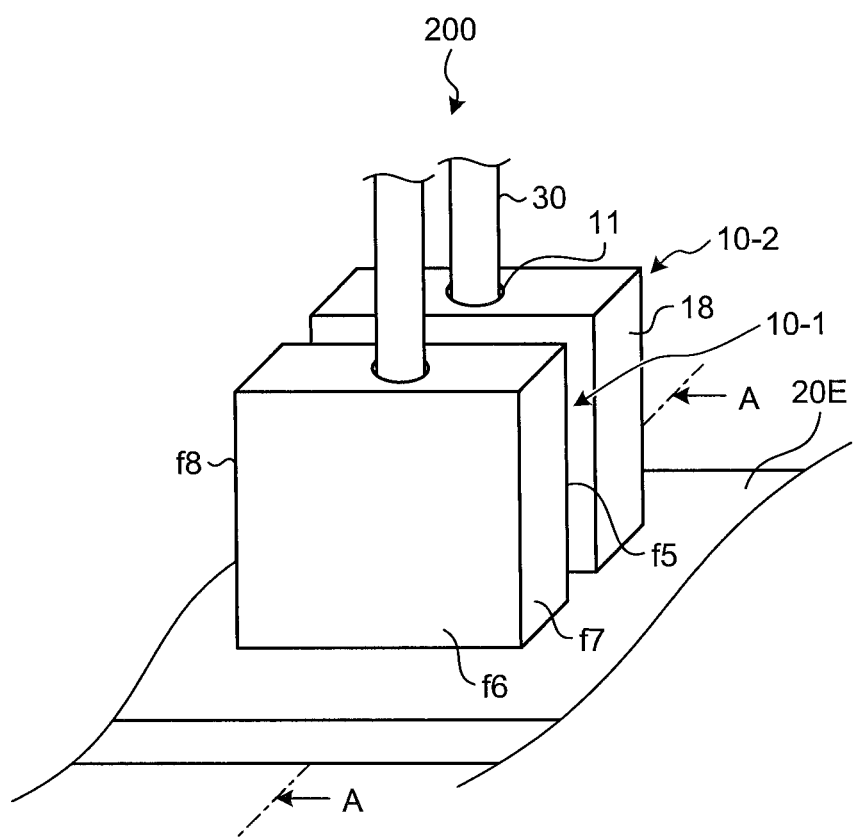
FIG. 10 is a perspective view of an optical transmission module according to a second embodiment of the present disclosure.
Figure 11:
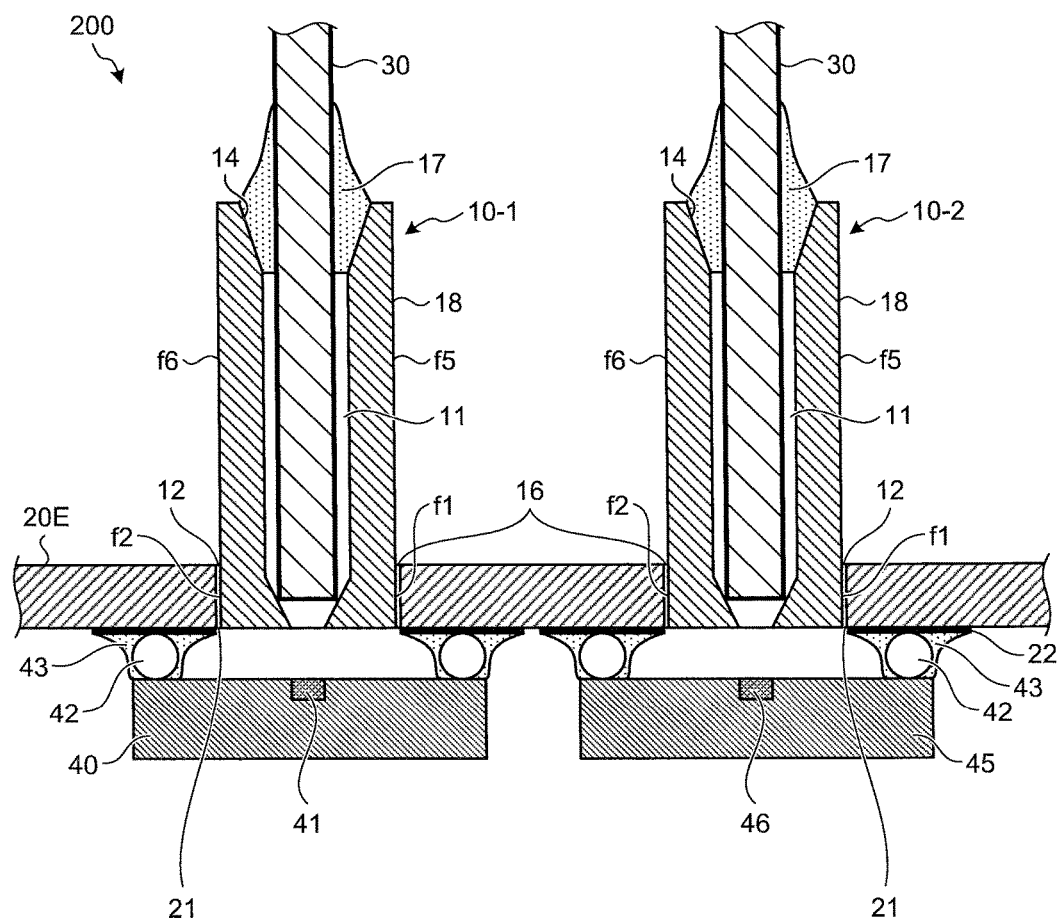
FIG. 11 is a cross-sectional view of the optical transmission module of FIG. 10 taken along line A-A.

An optical transmission module according to a second embodiment is configured so that two optical fiber holding structures are mounted on a substrate, and a light emitting element and a light receiving element face optical fibers held by the optical fiber holding structures via the substrate. FIG. 10 is a perspective view of the optical transmission module according to the second embodiment of the present disclosure. FIG. 11 is a cross-sectional view of the optical transmission module of FIG. 10 taken along line A-A.

The optical transmission module 200 according to the second embodiment includes the two optical fibers 30, the two optical fiber holding structures 10 (10-1 and 10-2), a substrate 20E, the light emitting element 40, and a light receiving element 45 including a light receiving unit 46. Each of the optical fiber holding structures 10 holds the corresponding one of the optical fibers 30. The substrate 20E has the two opening portions 21 into which the respective protruding portions 12 of the optical fiber holding structures 10 are inserted. The optical transmission module 200 according to the second embodiment includes the two optical fibers 30 and the two optical elements, and the two opening portions 21 are formed in the substrate 20E. However, the number of these components is not limited to two. In addition, two light emitting elements 40 or two light receiving elements 45 may be provided as the optical elements.

Each of the optical fiber holding structures 10 (10-1 and 10-2) used in the second embodiment is the optical fiber holding structure 10 according to the first embodiment, and as illustrated in FIG. 11, the two opposite side surfaces f5 and f6 of the structure main body 18 are flush with the two opposite side surfaces f1 and f2 of the protruding portion 12, respectively. In the optical transmission module 200, the two optical fiber holding structures 10 are mounted so that the side surfaces f5 and f6 of the structure main bodies 18 flush with the side surfaces f1 and f2 of the protruding portions 12 parallelly face each other. In other words, the optical fiber holding structures 10 are mounted so that the side surface f5 of the optical fiber holding structure 10-1 parallelly faces the side surface f6 of the optical fiber holding structure 10-2.

Since the two optical fiber holding structures 10 (10-1 and 10-2) are mounted so that the side surfaces f5 and f6 of the structure main bodies 18 flush with the side surfaces f1 and f2 of the protruding portions 12 parallelly face each other, the mounting density of the substrate 20E can be increased. In addition, the optical fiber holding structures 10 are mounted so that the contact portions 13a and 13b (refer to FIGS. 1A and 1B) abut on the substrate 20E, whereby the optical fiber 30 can be accurately positioned relative to the light emitting element 40 or the light receiving element 45.

Third Embodiment

Figure 12A:
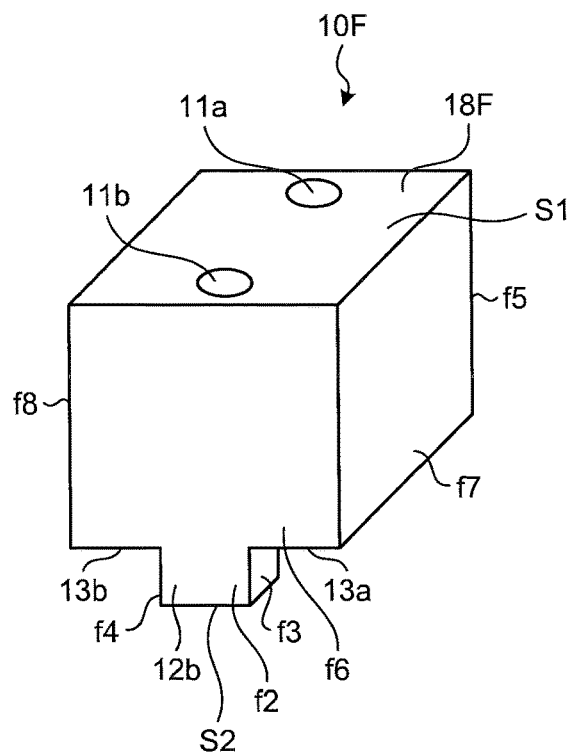
FIG. 12A is a perspective view of an optical fiber holding structure according to a third embodiment of the present disclosure.
Figure 12B:
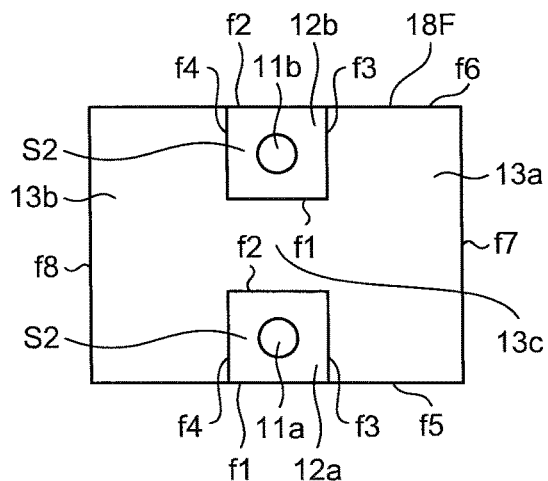
FIG. 12B is a plan view of the optical fiber holding structure of FIG. 12A seen from a bottom side where protruding portions are formed.

An optical fiber holding structure according to a third embodiment is configured so that two through holes are formed for insertion of optical fibers, and two protruding portions are formed. FIG. 12A is a perspective view of the optical fiber holding structure according to the third embodiment of the present disclosure. FIG. 12B is a plan view of the optical fiber holding structure of FIG. 12A seen from a bottom side where the protruding portions are formed.

The optical fiber holding structure 10F according to the third embodiment is configured so that the two through holes 11a and 11b are formed in a structure main body 18F, and the two protruding portions 12a and 12b having angular shapes are formed on the structure main body 18F. The through holes 11a and 11b are formed so as to penetrate from the upper surface S1 of the structure main body 18F through which the optical fibers 30 are inserted to the end surfaces S2 of the protruding portions 12 (12a and 12b). The protruding portion 12a is formed so that the side surface f1 is flush with the side surface f5 of the structure main body 18F, and the protruding portion 12b is formed so that the side surface f2 is flush with the side surfaces f6 of the structure main body 18F.

The through holes 11a and 11b are formed adjacent to the opposite side surfaces f5 and f6 of the structure main body 18F in the centers of the protruding portions 12a and 12b, respectively. The through holes 11a and 11b are formed perpendicular to the upper surface S1 of the structure main body 18F and the end surfaces S2 of the protruding portions 12a and 12b. The taper 14 and the taper 15 are formed at the respective ends of each of the through holes 11a and 11b.

Figure 13:
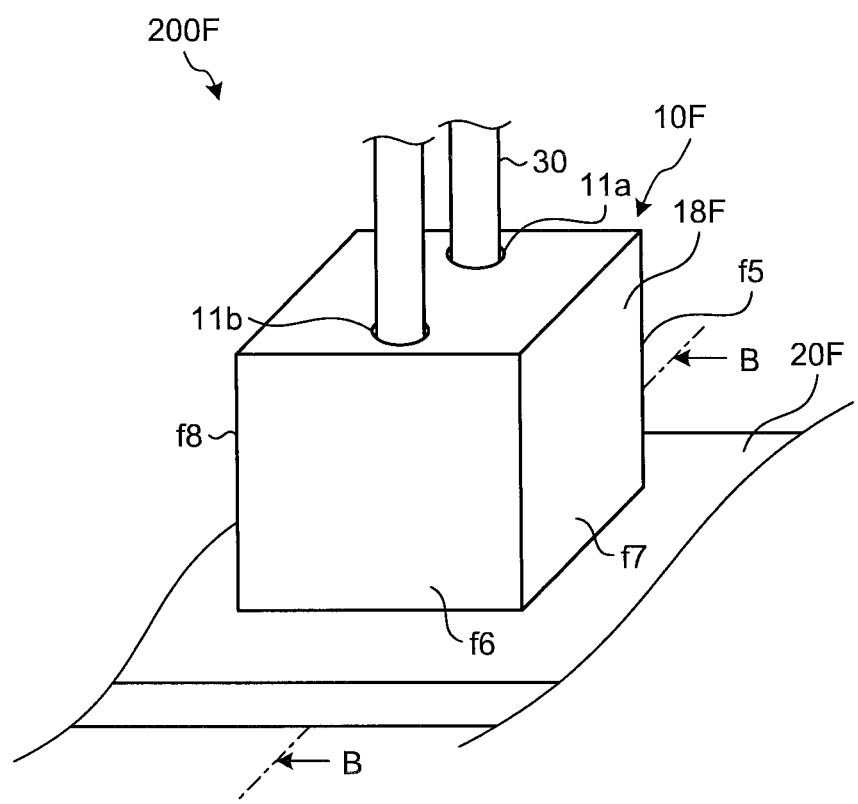
FIG. 13 is a perspective view of an optical transmission module with the optical fiber holding structure of FIGS. 12A and 12B.
Figure 14:
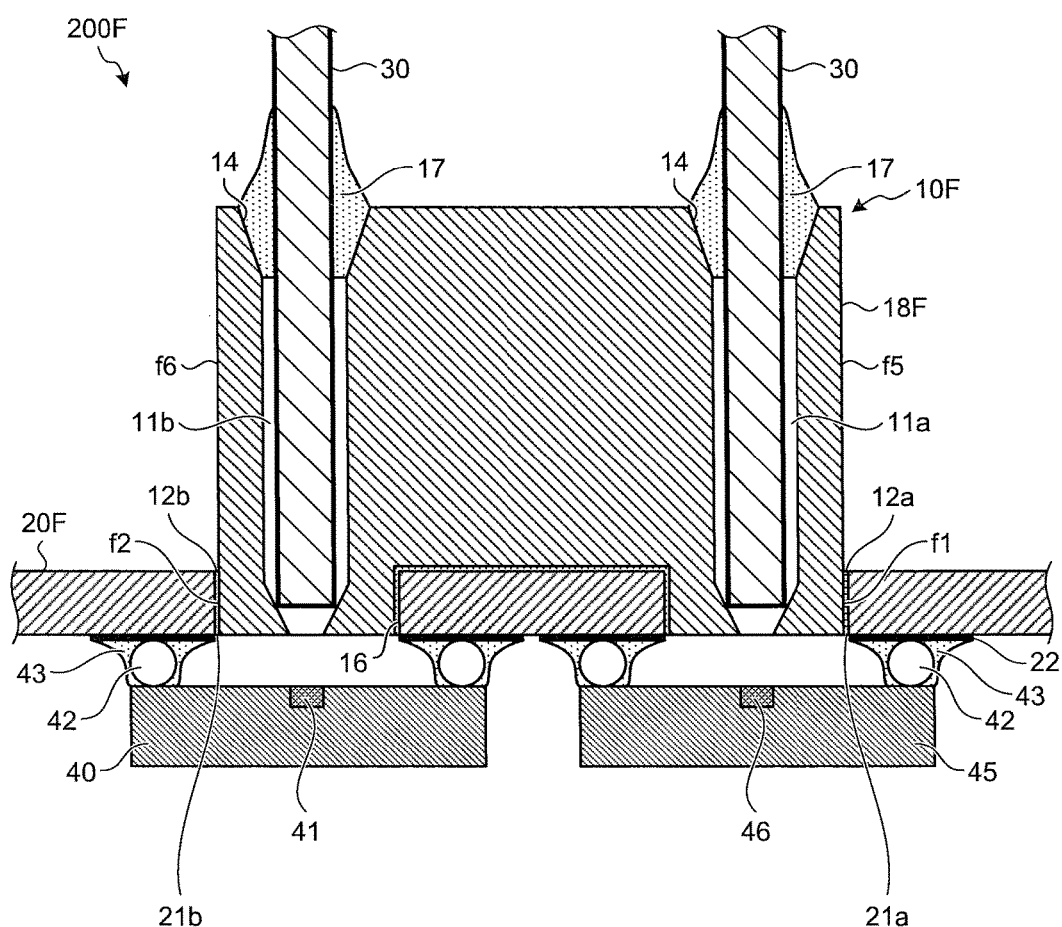
FIG. 14 is a cross-sectional view of the optical transmission module of FIG. 13 taken along line B-B.

FIG. 13 is a perspective view of an optical transmission module with the optical fiber holding structure of FIGS. 12A and 12B. FIG. 14 is a cross-sectional view of the optical transmission module of FIG. 13 taken along line B-B. The optical transmission module 200F includes the optical fiber holding structure 10F, a substrate 20F, the light emitting element 40, and the light receiving element 45. The optical fiber holding structure 10F holds the two optical fibers 30. The substrate 20F has two opening portions 21a and 21b into which the protruding portions 12a and 12b of the optical fiber holding structure 10F are respectively inserted.

In the optical fiber holding structure 10F according to the third embodiment, the side surface f5 of the structure main body 18F is formed so as to be flush with the side surface f1 of the protruding portion 12a, and the side surface f6 of the structure main body 18F is formed so as to be flush with the side surface f2 of the protruding portion 12b. Therefore, since contact portions do not exist adjacent to the side surfaces f5 and f6, the area in which the optical fiber holding structure 10F is mounted on the substrate 20F can be reduced, and the mounting density of the substrate 20F can be increased. In addition, the optical fiber holding structure 10F is mounted so that the contact portions 13a, 13b, and 13c abut on the substrate 20F, whereby the optical fibers 30, the light emitting element 40, and the light receiving element 45 can be accurately positioned.

In the third embodiment, the protruding portions 12a and 12b are formed on the structure main body 18F, and the protruding portions 12a and 12b are inserted into the opening portions 21a and 21b of the substrate 20F, respectively. Alternatively, the protruding portion may be configured to be formed only for the optical fiber 30 that transmits light from the light emitting element 40, and not to be formed for the light receiving element 45.

As described above, the optical fiber holding structure and the optical transmission module of the present disclosure are useful for the purpose of high-speed signal transmission between an image sensor having a large number of pixels and a signal processing device. In addition, the optical fiber holding structure and the optical transmission module of the present disclosure are particularly suitable for applications such as, for example, endoscopes and ultrasound image systems (ultrasound endoscopes), which perform high-speed data communication and require reduction in size.

According to the present disclosure, an optical fiber can be accurately aligned with a light emitting element or a light receiving element, and the mounting density of a substrate for mounting can be increased.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical fiber holding structure for being mounted on a substrate equipped with an optical element that includes a light receiving unit inputting an optical signal or a light emitting unit outputting an optical signal such that the optical fiber holding structure faces the optical element via the substrate, the optical fiber holding structure being configured to hold an optical fiber that transmits the optical signal to or from the optical element, the optical fiber holding structure comprising:
    a structure main body having a prismatic shape;
    a through hole into which the optical fiber is inserted;
    a protruding portion having a columnar shape projecting from the structure main body and configured to be inserted into an opening portion of the substrate; and
    a contact portion configured to abut on a surface of the substrate to position the optical element and the optical fiber at a predetermined distance, wherein
    the through hole is formed so as to penetrate from a surface of the structure main body through which the optical fiber is inserted to an end surface of the protruding portion, and
    at least one side surface of the structure main body is flush with at least one side surface of the protruding portion.

2. The optical fiber holding structure according to claim 1, wherein
    two opposite side surfaces of the structure main body are flush with respective two opposite side surfaces of the protruding portion.

3. The optical fiber holding structure according to claim 2, wherein
    the through hole and the protruding portion are displaced from a center axis of a prism of the structure main body.

4. The optical fiber holding structure according to claim 1, wherein
    three side surfaces of the structure main body are flush with respective three side surfaces of the protruding portion.

5. An optical transmission module comprising:
    an optical fiber that transmits an optical signal;
    the optical fiber holding structure according to claim 1 that holds the optical fiber;
    an optical element having a light receiving unit that inputs the optical signal or a light emitting unit that outputs the optical signal; and
    a substrate on which the optical fiber holding structure is mounted, and the optical element is mounted, the substrate having an opening portion into which the protruding portion of the optical fiber holding structure is inserted, wherein
    the optical fiber holding structure is mounted on the substrate such that the protruding portion is inserted into the opening portion of the substrate, and the contact portion abuts on a surface of the substrate, and
    the optical element is mounted on the substrate so as to face the optical fiber held by the optical fiber holding structure via the opening portion of the substrate.

6. The optical transmission module according to claim 5, wherein
    the substrate has two or more opening portions, and
    two or more optical fiber holding structures according to claim 1 are mounted in the two or more opening portions such that side surfaces of the structure main bodies flush with side surfaces of the protruding portions parallelly face each other.

7. The optical transmission module according to claim 5, wherein
the substrate has two or more opening portions, and
two or more optical fiber holding structures according to claim 4 are mounted in the two or more opening portions such that opposite side surfaces of the structure main bodies flush with opposite side surfaces of the protruding portions are parallel with each other.

8. A method of manufacturing the optical fiber holding structure according to claim 1, the method comprising:
forming an aggregate of two or more optical fiber holding structures that are in contact with each other at side surfaces of structure main bodies flush with side surfaces of protruding portions; and
a dicing, into the optical fiber holding structures, the aggregate along the side surfaces of the structure main bodies flush with the side surfaces of the protruding portions.

\* \* \* \* \*